(12) United States Patent
Lee et al.

(10) Patent No.: US 11,388,457 B2
(45) Date of Patent: Jul. 12, 2022

(54) RADIO STATION PROVIDER MANAGEMENT SYSTEMS AND METHODS

(71) Applicant: Apple Inc., Cupertino, CA (US)

(72) Inventors: Alan Lee, San Jose, CA (US); Thomas M. Alsina, Saratoga, CA (US); Nathaniel P. Marrin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 33 days.

(21) Appl. No.: 16/853,343

(22) Filed: Apr. 20, 2020

(65) Prior Publication Data
US 2020/0382818 A1    Dec. 3, 2020

Related U.S. Application Data

(60) Provisional application No. 62/855,585, filed on May 31, 2019.

(51) Int. Cl.
| | | |
|---|---|---|
| *H04N 21/23* | (2011.01) | |
| *H04N 21/2387* | (2011.01) | |
| *H04N 21/233* | (2011.01) | |
| *H04N 21/278* | (2011.01) | |
| *H04N 21/422* | (2011.01) | |

(52) U.S. Cl.
CPC ....... *H04N 21/2387* (2013.01); *H04N 21/233* (2013.01); *H04N 21/278* (2013.01); *H04N 21/42221* (2013.01)

(58) Field of Classification Search
None
See application file for complete search history.

(56) References Cited

U.S. PATENT DOCUMENTS

| | | | | |
|---|---|---|---|---|
| 9,747,325 | B2* | 8/2017 | Jolly | G06F 16/2365 |
| 2007/0142055 | A1* | 6/2007 | Toivanen | H04H 60/44 |
| | | | | 455/450 |
| 2012/0108266 | A1* | 5/2012 | Clark | H04W 4/02 |
| | | | | 455/456.3 |

* cited by examiner

*Primary Examiner* — Cai Y Chen
(74) *Attorney, Agent, or Firm* — Fletcher Yoder P.C.

(57) ABSTRACT

A method may include receiving radio station data associated with multiple radio stations from one or more radio station providers and filtering the radio stations based at least in part on playback availability. Playback availability may include a broadcast right associated with the one or more radio station providers. The method may also include removing duplicate radio stations and supplying a searchable radio station directory to a platform or a client device.

19 Claims, 10 Drawing Sheets

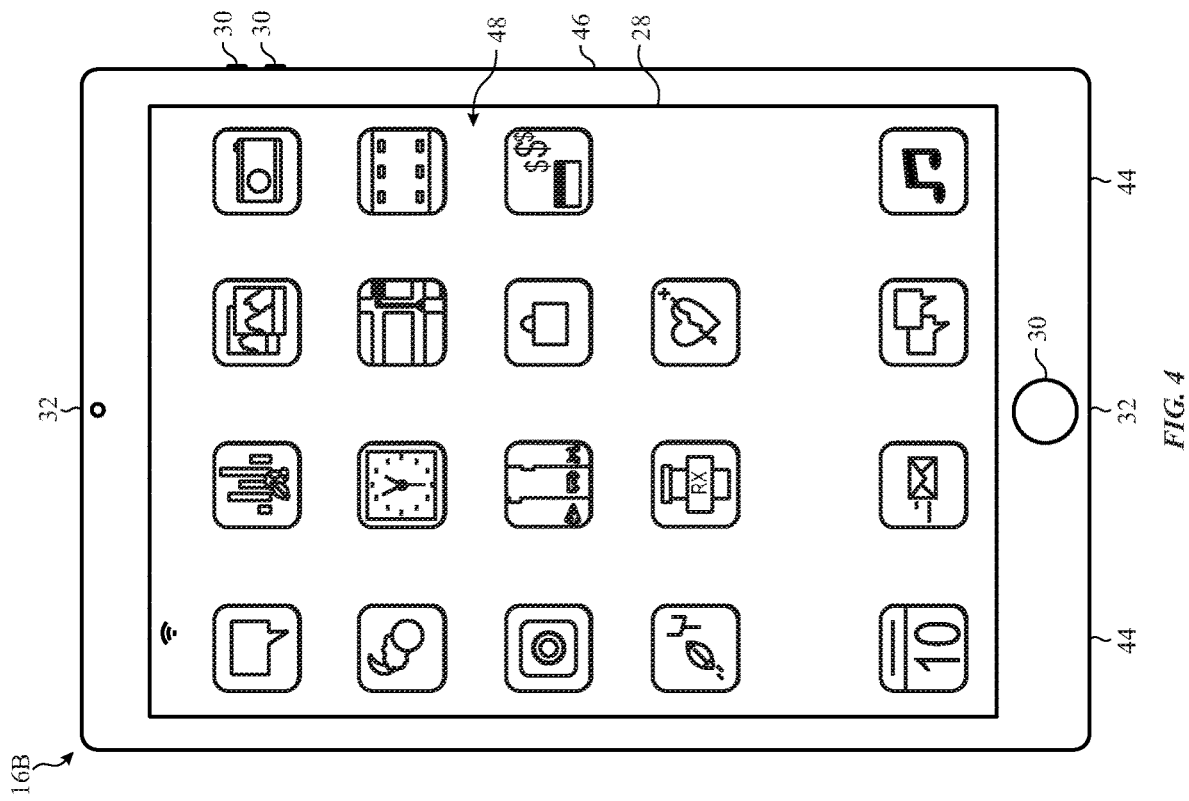
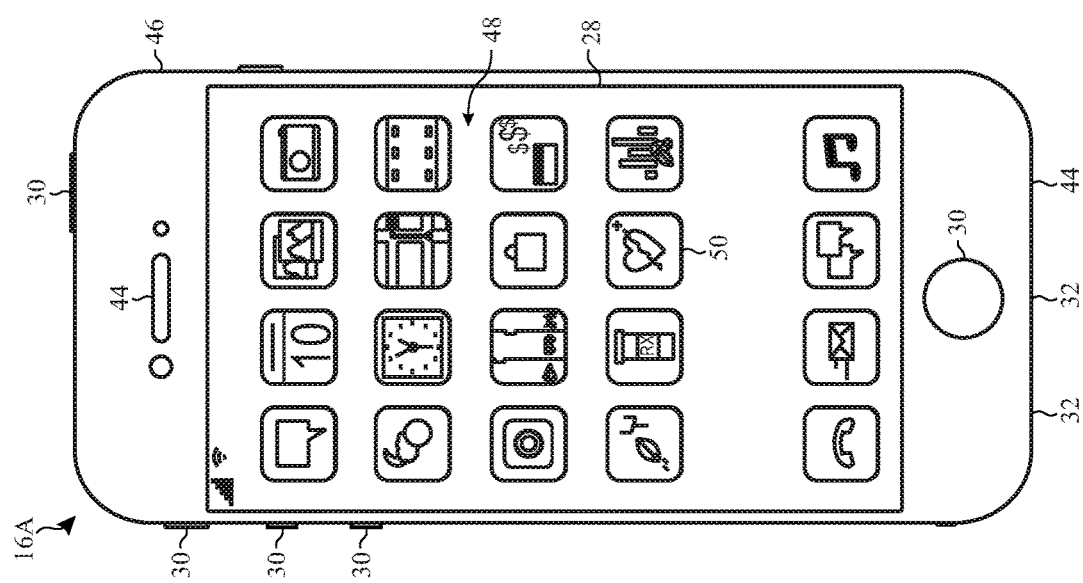

CONGLOMERATED STATIONS FROM ALL PROVIDERS (INCLUDES DUPLICATES)

| INDEX | NAME | IDENTIFIER | BAND | FREQUENCY | LOCATION | PROVIDER | AVAILABILITY |
|---|---|---|---|---|---|---|---|
| 1 | THE BUZZ | KTBZ | FM-HD1 | 94.5 | HOU, TX | 1 | USA |
| 2 | THE BULL | KKBQ | FM | 100.3 | HOU, TX | 1 | USA |
| 3 | THE BAY | - | FM | - | S.J., CA | 1 | USA |
| 4 | SPORTSTALK790 | KBME | FM-HD2 | 94.5 | HOU, TX | 1 | USA |
| 5 | THE BUZZ | - | FM-HD1 | 94.5 | - | 2 | USA, MX |
| 6 | - | KKBQ | FM | 100.3 | HOU, TX | 2 | USA |
| 7 | HOUSTON PUBLIC MEDIA | KUHF | FM | 88.7 | HOU, TX | 1 | USA |
| 8 | NPR | KQED | FM | 88.5 | S.J., CA | 2 | USA, MX |
| 9 | THE BAY | KBAY | FM | 94.5 | S.J., CA | 2 | MX |
| 10 | SPORTSTALK790 | KBME | AM | 790 | HOU, TX | 1 | USA, MX |
| 11 | NPR | KUHF | FM | 88.7 | HOU, TX | 2 | USA |

*FIG. 8*

USA STATIONS

| NAME | IDENTIFIER | BAND | FREQUENCY | LOCATION | PROVIDER | HIDDEN PROVIDER | TAGS |
|---|---|---|---|---|---|---|---|
| THE BUZZ | KTBZ | FM-HD1 | 94.5 | HOU, TX | 1 | 2 | |
| THE BULL | KKBQ | FM | 100.3 | HOU, TX | 1 | | |
| THE BAY | KBAY | FM | 94.5 | S.J., CA | 1 | 2 | |
| SPORTSTALK790 | KBME | FM-HD2, (AM) | 94.5, (790) | HOU, TX | 1 | | |
| HOUSTON PUBLIC MEDIA | KUHF | FM | 88.7 | HOU, TX | 1 | 2 | NPR |
| NPR | KQED | FM | 88.5 | S.J., CA | 2 | | NPR |

*FIG. 10*

MX STATIONS

| NAME | IDENTIFIER | BAND | FREQUENCY | LOCATION | PROVIDER | HIDDEN PROVIDER | TAGS |
|---|---|---|---|---|---|---|---|
| THE BUZZ | KTBZ | FM-HD1 | 94.5 | HOU, TX | 2 | | |
| THE BAY | KBAY | FM | 94.5 | S.J., CA | 1 | 2 | |
| NPR | KQED | FM | 88.5 | S.J., CA | 2 | | NPR |
| SPORTSTALK790 | KBME | FM-HD2, (AM) | 94.5, (790) | HOU, TX | 1 | | |

*FIG. 11*

RADIO STATION PROVIDER MANAGEMENT SYSTEMS AND METHODS

CROSS-REFERENCE TO RELATED APPLICATION

This application claims priority to and the benefit of U.S.A. Provisional Application No. 62/855,585, entitled "RADIO STATION PROVIDER MANAGEMENT SYSTEMS AND METHODS," filed May 31, 2019, which is herein incorporated by reference in its entirety. This disclosure relates to efficient parsing, identification, searching, and playback of audio broadcasts from multiple different radio station providers.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—including televisions, portable phones, computers, wearable devices, vehicle infotainment platforms, home streaming devices, and more—receive and play audio broadcasts. Such audio broadcasts may include, but are not limited to, frequency modulated (FM), amplitude modulated (AM), satellite based, and/or internet based radio stations. Moreover, radio station providers (e.g., media groups, individual station owners, agglomeration services, publishing agencies, etc.) may contract with broadcast or streaming services to provide users with access to the individual audio broadcasts. However, searching through lists of hundreds or thousands of radio stations, including multiple duplicates of the same radio station, to find a particular station may result in a cumbersome user experience. Additionally, certain audio broadcasts may have reduced availability based on location or radio station provider contract limitations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Efficient searching and deduplication of the accumulated audio broadcasts from multiple station providers, while taking into account playback rights, location, and/or user preferences, may yield increased efficiency in searchability (e.g., faster results utilizing a reduced amount of processor bandwidth) as well as vetted more accurate search results for an improved user experience. This disclosure relates generally to efficient and accurate selection of radio stations requested by client devices. For example, the streaming services of multiple radio station providers may be parsed and indexed by a radio station manager to create a radio station directory that may be efficiently searched for a radio station requested by a client device. A radio station manager may identify duplicate radio stations among the multiple radio station providers and, thus, increase the efficiency and searchability of the radio station directory. Additionally, the radio station directory, and/or the platform providing access to the radio station directory, may take into account location data associated with the client device to factor in playback rights and/or assist in returning accurate search results. For example, a particular provider of a radio station may have broadcast rights in the U.S.A., but not Mexico. As such, the radio station manager may not allow a client device in Mexico to access that radio station from that particular provider, but may offer the radio station from a different provider or remove the radio station from the radio station directory available in Mexico. As such, the radio station manager may take into account playback rights, location data, and/or user preferences to provide a requested radio station to a client device. The radio station manager, thus, may yield increased efficiency in searchability (e.g., faster results utilizing a reduced amount of processor bandwidth) as well as vetted more accurate search results for an improved user experience.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is an example of the electronic device of FIG. 1, in accordance with an embodiment;

FIG. 4 is another example of the electronic device of FIG. 1, in accordance with an embodiment;

FIG. 8 is a table of an example listing of conglomerated radio stations, in accordance with an embodiment;

FIG. 10 is a table of an example radio station directory, in accordance with an embodiment;

FIG. 11 is a table of an example radio station directory, in accordance with an embodiment;

DETAILED DESCRIPTION

Figure 1:
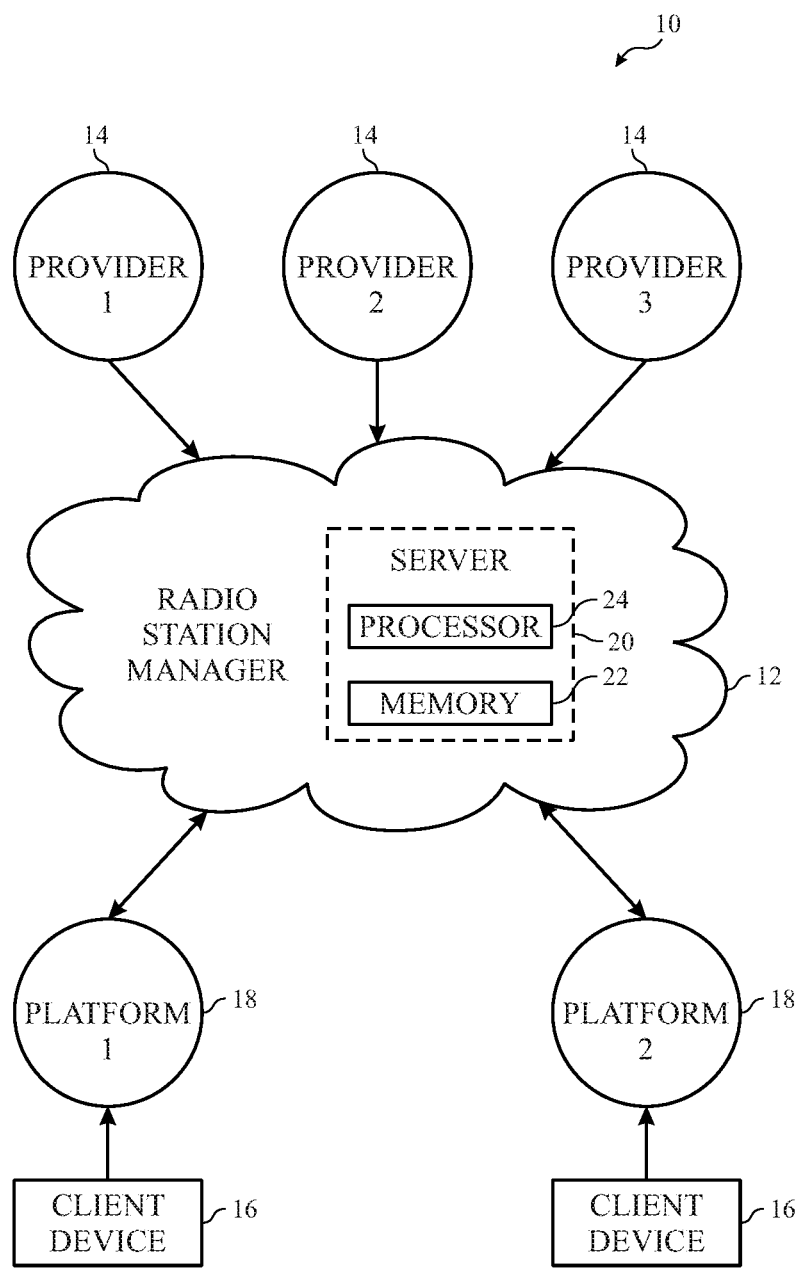
FIG. 1 is a schematic diagram of a network for providing radio stations to client devices via a radio station manager, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Many different electronic devices such as televisions, portable phones, computers, wearable devices, vehicle infotainment platforms, and home streaming devices receive and play audio broadcasts. Such audio broadcasts may include, but are not limited to, frequency modulated (FM), amplitude modulated (AM), satellite based, and/or internet based radio stations. As used herein, a "radio station" may refer to any suitable type of audio broadcast, live or recorded. Moreover, radio stations may also include stations that do not have a radio frequency (RF) transmission, but, instead, are streamed online-only.

In some scenarios, depending on the method of transmission/reception (e.g., via FM radio, AM radio, or satellite radio) availability of certain radio stations may be limited. For example, an FM radio receiver may not get reception for an FM radio station broadcast 200 miles away. As such, some radio station providers (e.g., media groups, individual station owners, agglomeration services, publishing agencies, etc.) may provide or contract with streaming services (e.g., internet based streaming) to provide users with access to the individual audio broadcasts regardless of radio frequency (RF) reception.

Moreover, in some embodiments, the streaming services of multiple radio station providers may be parsed and indexed by a radio station manager to create a single radio station directory that may be efficiently searched for a desired radio station requested by a client device. The radio station manager may also identify duplicate radio stations among the multiple streaming services and, thus, increase the efficiency and searchability of the radio station directory. Additionally, the radio station manager or a platform providing access to the radio station directory may take into account location data of the client device to factor in playback rights. For example, a particular provider of a radio station may have broadcast rights in the U.S.A. but not Mexico. As such, the radio station manager may not allow a client device in Mexico to access that radio station from that particular provider, but may offer the radio station from a different provider or remove the radio station from the radio station directory available to Mexico. Further, the radio station manager may allow for a more accurate determination of the desired radio station from the radio station directory by taking into account location data, and/or user preferences. For example, a radio station provider of a national brand may have multiple different local affiliates, and if the national brand is requested by the client device, the local affiliate in closest proximity to the client device may be provided for playback. The radio station manager, thus, may yield increased efficiency in searchability (e.g., faster results utilizing a reduced amount of processor bandwidth) as well as vetted more accurate search results for an improved user experience.

To help illustrate, one embodiment of a radio station providing network 10 utilizing a radio station manager 12 is provided in FIG. 1. The radio station providing network 10 may also include one or more radio station providers 14 to provide radio station feeds, one or more client devices 16 to request and receive access to a radio station feed, and/or one or more platforms 18 to manage connections of the client devices 16. As should be appreciated, the radio station manager 12 may include any suitable processing circuitry to process radio station data from the radio station providers 14 and generate a radio station directory. In some embodiments, the radio station manager 12 may perform cloud based processing on a server (or datacenter) 20 remote from the radio station providers 14 and/or the platforms 18. The server 20 may execute instructions stored in memory 22 by one or more processors 24. The memory 22 may include tangible, non-transitory, computer-readable media that store data and/or instructions executable by the processor 24. Further, the memory 22 may include one or more file systems such as a Hadoop Distributed File System (HDFS) for increased aggregate bandwidth. Furthermore, the processor 24 may include one or more general purpose microprocessors, one or more application specific processors (ASICs), one or more field programmable logic arrays (FPGAs), or any combination thereof. Moreover, in some embodiments, the radio station manager 12 may operate on a server 20 proximate to or along with one or more of the platform services (e.g., operated as part of a platform 18) and/or operate natively on the client device 16. As should be appreciated, functions of the radio station manager 12, the client devices 16, and/or the platforms 18 may be shared and/or divided amongst each other via cloud based and/or local processing.

The radio station providers 14 supply the radio station manager 12 with access to individual radio stations as well as data (e.g., metadata) about the radio stations. For example, radio station providers 14 may provide the radio station manager 12 with radio station names, broadband regulatory authority (e.g., Federal Communications Commission (FCC)) identifiers, frequencies and bands of transmission, and/or the originating location of the broadcast.

Radio station providers 14 may include first party providers, second party providers, or third party providers, for example. First party providers may provide radio stations directly owned and/or operated by an entity that oversees the radio station manager 12 and/or one or more of the platforms 18. Second party providers may provide direct access to one or more radio stations owned and/or operated the second party, for example, via a direct contractual relationship. Third party providers may include radio station agglomeration services. For example, a third party provider may have streaming rights to radio stations that are not owned and/or operated by the third party provider, and provide such radio stations to the radio station manager 12 for distribution to a client device 16. As should be appreciated, a single provider 14 may be a second party provider of some radio stations and a third party provider of other radio stations.

Figure 2:
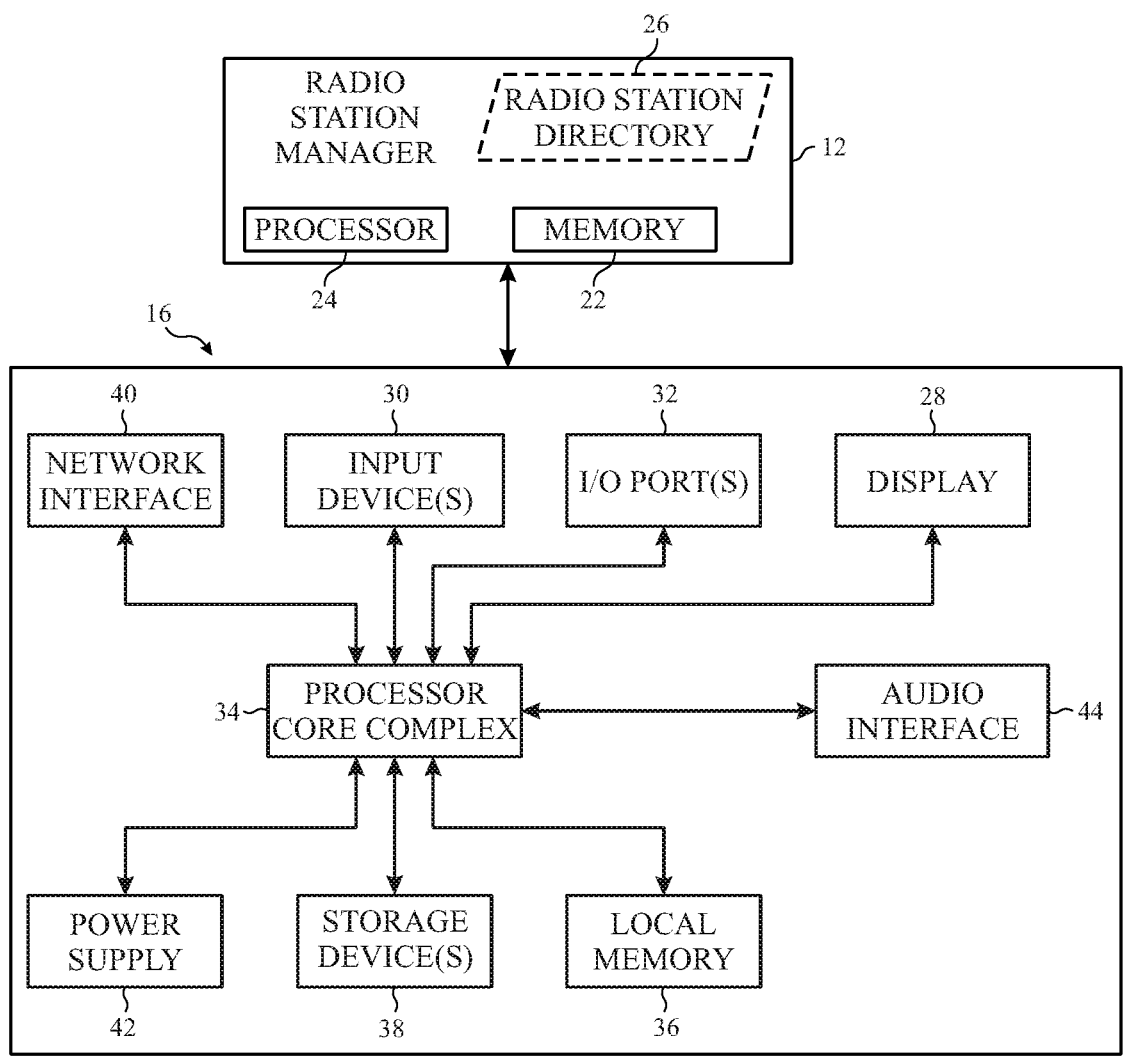
FIG. 2 is a block diagram of an electronic device which may utilize aspects of the radio station manager, in accordance with an embodiment.

As will be described in more detail below, the client device 16, as shown in FIG. 2, may be any suitable electronic device for requesting and playing a radio station identified via the radio station directory 26 generated by the radio station manager 12. For example, a client device 16 may include a handheld electronic device, a tablet electronic device, a notebook computer, a home streaming device, a vehicle infotainment system, or the like. Thus, it should be noted that FIG. 2 merely illustrates one example of a particular implementation and is intended to illustrate the types of components that may be present in the client device 16.

In the depicted embodiment, the client device 16 may include the electronic display 28, input devices 30, input/output (I/O) ports 32, a processor core complex 34 having one or more processors or processor cores, local memory 36, a main memory storage device 38, a network interface 40, a power source 42, and an audio interface 44 such as speakers and/or a microphone. The various components described in FIG. 2, such as that of the client device 16 and/or the radio station manager 12, may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 36 and the main memory storage device 38 may be included in a single component.

As depicted, the processor core complex 34 is operably coupled with local memory 36 and the main memory storage device 38. In some embodiments, the local memory 36 and/or the main memory storage device 38 may include tangible, non-transitory, computer-readable media that store instructions executable by the processor core complex 34 and/or data to be processed by the processor core complex 34. For example, the local memory 36 may include random access memory (RAM) and the main memory storage device 38 may include read only memory (ROM), rewritable non-volatile memory such as flash memory, hard drives, optical discs, and/or the like.

In some embodiments, the processor core complex 34 may execute instruction stored in local memory 36 and/or the main memory storage device 38 to perform operations. As such, the processor core complex 34 may include one or more general purpose microprocessors, one or more application specific processors (ASICs), one or more field programmable logic arrays (FPGAs), or any combination thereof.

As depicted, the processor core complex 34 is also operably coupled with the network interface 40. Using the network interface 40, the client device 16 may be communicatively coupled to the radio station providing network 10 and/or other electronic devices. For example, the network interface 40 may connect the client device 16 via a personal area network (PAN), such as a Bluetooth® network, a local area network (LAN), such as an 802.11x Wi-Fi network, and/or a wide area network (WAN), such as a 4G, or LTE, or 5G cellular network. In this manner, the network interface 40 may enable the client device 16 to transmit a request for a radio station feed and/or receive the radio station feed.

Additionally, as depicted, the processor core complex 34 is operably coupled to the power source 42. In some embodiments, the power source 42 may provide electrical power to operate the processor core complex 34 and/or other components in the client device 16. Thus, the power source 42 may include any suitable source of energy, such as a rechargeable lithium polymer (Li-poly) battery and/or an alternating current (AC) power converter.

Furthermore, as depicted, the processor core complex 34 is operably coupled with the I/O ports 32 and the input devices 30. In some embodiments, the I/O ports 32 may enable the client device 16 to interface with various other electronic devices. Additionally, in some embodiments, the input devices 30 may enable a user to interact with the client device 16. For example, the input devices 30 may include buttons, keyboards, mice, trackpads, and the like. Additionally or alternatively, the electronic display 28 may include touch sensing components that enable user inputs to the client device 16 by detecting occurrence and/or position of an object touching its screen (e.g., surface of the electronic display 28).

In addition to enabling user inputs, the electronic display 28 may facilitate providing visual representations of information by displaying one or more images (e.g., image frames or pictures). For example, the electronic display 28 may display a graphical user interface (GUI) of an operating system, an application interface, text, a still image, or video content. In some embodiments, the electronic display 28 may display a portion of the radio station directory 26 from which a user may select available radio stations.

The audio interface 44 of the client device 16 may allow for playback of a radio station, for example via a speaker. In some embodiments, the client device 16 may play the radio station natively on built-in speakers and/or by connection to external speakers (e.g., via a Bluetooth® connection, Wi-Fi connection, audio cable, etc.). Additionally or alternatively, the audio interface 44 may include a microphone for accepting audible commands by a user. For example, a request to play a particular radio station may be indicated by the user speaking a desired radio station name.

As described above, the client device 16 may be any suitable electronic device. To help illustrate, one example of a suitable client device 16, specifically a handheld device 16A, is shown in FIG. 3. In some embodiments, the handheld device 16A may be a portable phone, a media player, a personal data organizer, a handheld game platform, and/or the like. For example, the handheld device 10A may be a smart phone, such as any iPhone® model available from Apple Inc.

As depicted, the handheld device 16A includes an enclosure 46 (e.g., housing). In some embodiments, the enclosure 46 may protect interior components from physical damage and/or shield them from electromagnetic interference. In the depicted embodiment, the electronic display 28 is displaying a graphical user interface (GUI) 48 having an array of icons 50. By way of example, when an icon 50 is selected either by an input device 30 or a touch-sensing component of the electronic display 28, an application program may launch. Moreover, the GUI 48 may include one or more icons 50 to facilitate a selection of a radio station from the radio station directory 26.

Furthermore, input devices 30 may enable a user to interact with the handheld device 16A. For example, the input devices 30 may enable the user to activate or deactivate the handheld device 16A, navigate a user interface to a home screen, navigate a user interface to a user-configurable application screen, activate a voice-recognition feature, provide volume control, and/or toggle between vibrate and ring modes. The handheld device 16A may also include I/O ports 32 open through the enclosure 46. In some embodiments, the I/O ports 32 may include, for example, an audio jack to connect to external devices.

Figure 5:
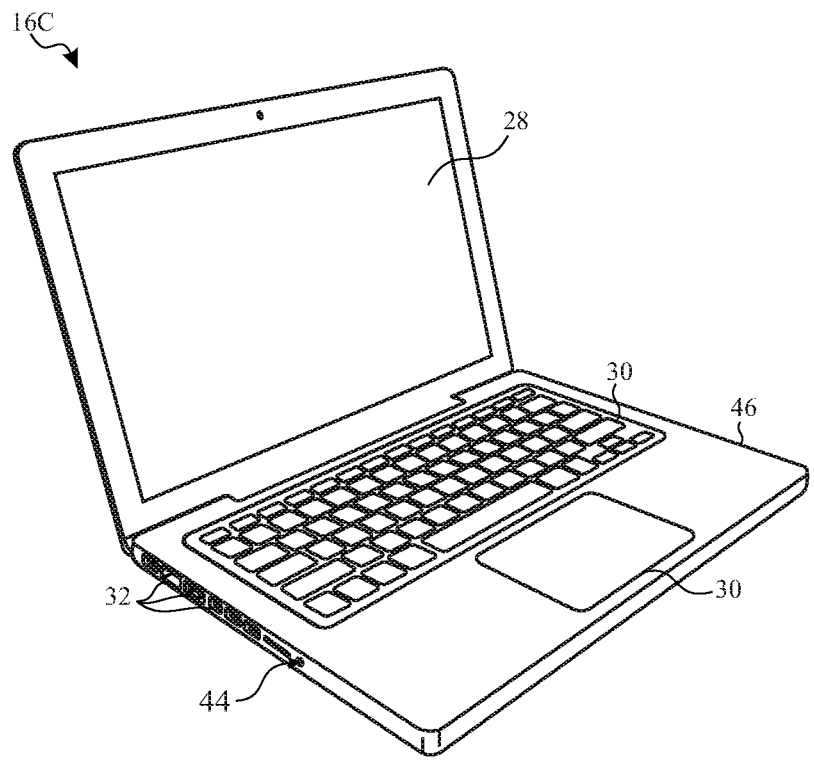
FIG. 5 is another example of the electronic device of FIG. 1, in accordance with an embodiment.
Figure 6:
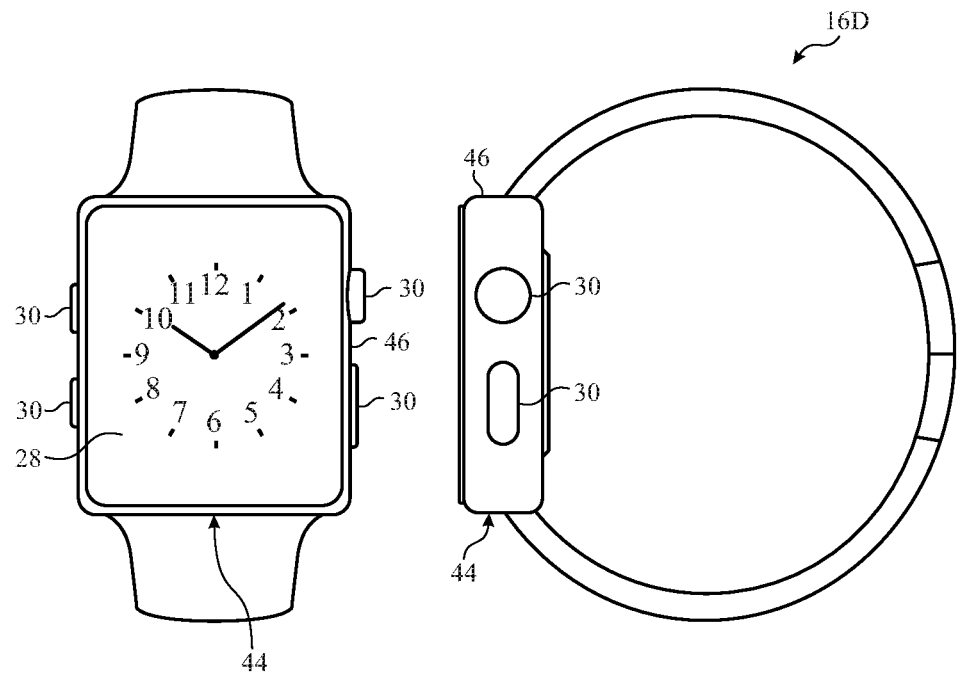
FIG. 6 is another example of the electronic device of FIG. 1, in accordance with an embodiment.
Figure 7:
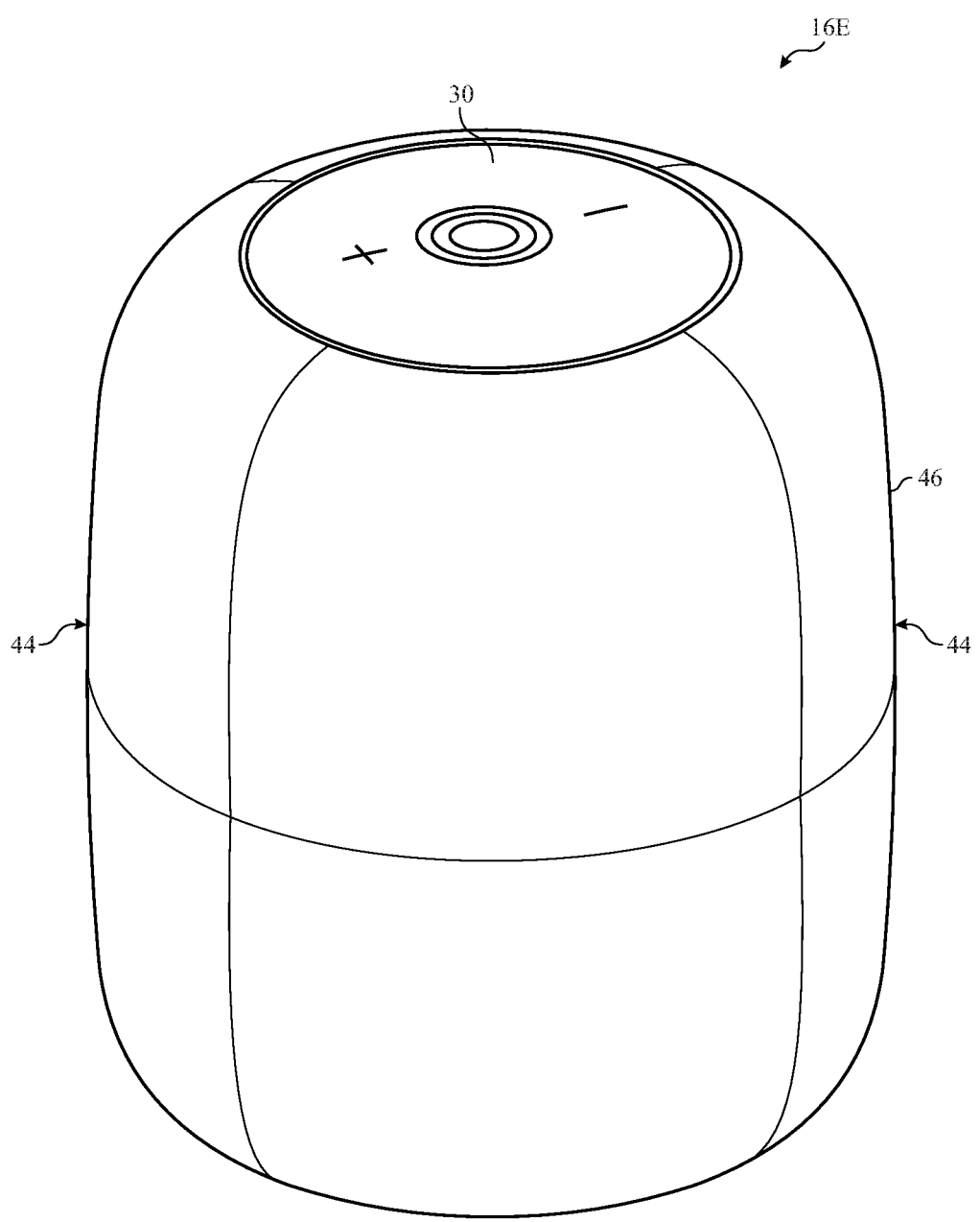
FIG. 7 is another example of the electronic device of FIG. 1, in accordance with an embodiment.

To further illustrate, another example of a suitable client device 16, specifically a tablet device 16B, is shown in FIG. 4. For illustrative purposes, the tablet device 16B may be any iPad® model available from Apple Inc. A further example of a suitable client device 16, specifically a computer 16C, is shown in FIG. 5. For illustrative purposes, the computer 16C may be any MacBook® or iMac® model available from Apple Inc. Another example of a suitable client device 16, specifically a watch 16D, is shown in FIG. 6. For illustrative purposes, the watch 16D may be any Apple Watch® model available from Apple Inc. Another example of a suitable client device 16, specifically a networked speaker and/or digital assistant 16E, is shown in FIG. 7. For illustrative purposes, the networked speaker and/or digital assistant 16E may be any Apple HomePod® model available from Apple Inc. As depicted, the tablet device 16B, the computer 16C, and the watch 16D each also includes an electronic display 28, input devices 30, I/O ports 32, and an enclosure 46. However, other suitable client devices 16 such as the networked speaker and/or digital assistant 16E and/or home streaming devices may not include an integrated electronic display 28. As such, the client device 16 may be any suitable electronic device for utilizing the radio station directory 26 (e.g., directly, via a platform 18, etc.) generated by the radio station manager 12 to facilitate playback of a radio station, directly (e.g., via an internal speaker) or indirectly (e.g., via an external/connected speaker).

Returning to FIG. 1, the client device 16 may access the radio stations of the radio station directory 26 via one or more platforms 18. In some embodiments, the platforms 18 may be implemented in software and accessed via the client device 16 locally or by accessing a cloud based platform 18. In one example, a platform 18 may be a version of iTunes Radio®, Apple Music®, or other service. Moreover, platforms 18 may support textual or voice input. For example, platforms may use voice recognition software to identify a desired radio station from an audible request made by a user or use a text/GUI 48 based interface to identify the desired radio station, or a combination thereof. Furthermore, linguistic and/or language modeling software may be used to identify the desired radio station. For example, nicknames or local slang for certain radio stations may be taken into account when matching the desired radio station to the radio station directory 26. As should be appreciated, different client devices 16 may utilize different platforms 18 and/or be capable of using multiple platforms 18. In some embodiments, the platform 18 may transmit the request for a desired radio station to the radio station manager 12 to identify the desired radio station among the radio stations in the radio station directory 26. Additionally, once a radio station is identified, the platform 18 may provide the radio station feed to the client device 16. Moreover, in some embodiments, the radio station directory 26 generated by the radio station manager 12, may be retained by the platform 18, such that repeated communication to the radio station manager 12 may be reduced.

In general, the radio station manager 12 may generate the radio station directory 26 based on received radio station data from the radio station providers 14. The radio station manager 12 may receive lists of radio stations and associated data from each radio station provider 14. FIG. 8 is an example conglomerated listing 52 of radio station data 54 received from two different radio station providers 14. In some embodiments, each radio station entry provided by each radio station provider 14 may be assigned an index for the conglomerated listing 52. The radio station data 54 for an indexed entry may include items such as a station name 56, a broadband identifier 58, a frequency 60 of transmission, a frequency band 61 (e.g., AM, FM, FM high definition (HD), etc.), a location 62 of origin, the radio station provider 14 from which the entry is provided, and/or a country or region of availability 64 for the entry from the listed radio station provider 14. For example, Index 1 has a station name 56 of "The Buzz," a provider 14 of "Provider 1," and has an availability 64 from "Provider 1" in the U.S.A. As should be appreciated, the depicted radio station data 54 is given as an example, and additional or different radio station data 54 may be obtained or utilized by the radio station manager 12 depending on implementation. Moreover, particular types of radio stations (e.g., internet based radio stations, High Definition (HD) radio stations, satellite radio stations, etc.) may include additional and/or different radio station data 54. As should be appreciated, the radio station names, identifiers, and frequencies are shown for example purposes and are non-limiting. Additionally, no affiliation with particular radio stations or radio station providers is intended to be expressed or insinuated.

The radio station manager 12 may review each entry of the conglomerated listing 52 and identify duplicate radio stations (e.g., radio stations provided by more than one provider 14 and/or duplicates from the same provider 14) based on the radio station data 54. However, in some scenarios, the radio station data 54 received from the providers 14 may not be uniform and/or be missing portions of the radio station data 54. For example, Index 5 has a station name 56 of "The Buzz," but is missing information such as the identifier 58. As such, the radio station manager 12 may identify matches between entries based on grouped portions of the radio station data 54. For example, the radio station manager 12 may examine the entry frequency 60, frequency band 61, and/or the entry location 62 and search for matches amongst the rest of the entries. In the example of FIG. 8, using a grouping (e.g., frequency 60, frequency band 61, and location 62) of radio station data 54, Index 2 and Index 6 may be identified as the same radio station, even though Index 6 is missing a name 56.

Additionally, groupings of radio station data 54 may also be used to identify duplicate entries. For example, the radio station manager 12 may examine the entry frequency 60, the frequency band 61, and the entry name 56. In the example of FIG. 8, using this grouping of radio station data 54, Index 1 and Index 5 may be identified as the same radio station, even though Index 5 is missing a location 62. Furthermore, the radio station manager 12 may, additionally or alternatively, examine the entry name 56 and the entry location 62 and search for matches amongst the rest of the entries. In the example of FIG. 8, using this grouping of radio station data 54, Index 4 and Index 10 may be identified as the same radio station, even though Index 10 is labeled as having a different frequency 60. Moreover, in some embodiments, the frequency band 61 may also be examined along with the entry name 56 and/or the entry location 62. In the example of FIG. 8, using this grouping of radio station data 54, Index 3 and Index 9 may be identified as the same radio station, even though Index 3 is lacks an identifier 58 and a frequency 60.

Groupings of radio station data 54 may be of particular use when the same radio station is broadcast on multiple frequencies 60 or when multiple different stations share a similar frequency 60 and location 62, such as High Definition (HD) radio. Utilizing the different groupings of radio station data 54 may assist in reducing duplicate stations within the radio station directory 26. As should be appreciated, other groupings of radio station data 54 may also be utilized based on the radio station data 54 provided by the providers 14. Additionally, in some embodiments, the groupings of radio station data 54 may be used in a particular order to increase efficiency. For example, in one embodiment, the frequency 60 and frequency band 61 may be examined first, and may be additionally examined with the entry location 62 and/or the entry name 56 second, and the name 56 and location 62 may be examined third.

As discussed above, different groupings of radio station data 54 may be used to identify duplicate entries. Additionally, the groupings of radio station data 54 may also be used to identify separate entries. In the example of FIG. 8, although Index 1 and Index 4 have the same frequency 60 and location 62, a grouping that includes the frequency band 61 could clarify that Index 1 and Index 4 are separate radio stations. In some embodiments, the frequency band 61 may be added to any grouping of radio station data 54 to facilitate improved identification of separate versus duplicate entries.

Furthermore, as stated above, some of the radio station data 54 may be missing or incorrect. As such, in some embodiments, a confidence score may be associated with the assignment of a particular entry as a separate station or duplicate station based on the radio station data 54. For example, matches amongst the metadata (e.g., name 56, identifier, 58, frequency 60, frequency band 61, and/or location 62) between two entries may increase the confidence score, and, in some embodiments, a confidence score above a duplicate threshold may result in the entries being recognized as a single radio station. Moreover, each piece of the metadata may be weighted differently and/or may be have separate weights when in grouping of radio station data 54 as discuss above. Additionally or alternatively, the confidence score may be based on geographical data (e.g., latitude and longitude). In other words, the radio station data 54 may include a broadcast position (e.g., latitude and longitude) of the radio station, or the radio station data 54 may be interpolated to determine a broadcast position (e.g., latitude and longitude), which may be used to differentiate separate radio stations from duplicate radio stations. For example, if a first radio station is determined to have a first broadcast location (e.g., latitude and longitude), and a second radio stations is determined to have a second broadcast location (e.g., latitude and longitude) greater than a threshold distance (e.g., 1 mile, 10 miles, 100 miles, etc.) away from the first broadcast location, then the confidence score (e.g., duplicate confidence score) may be decreased, and vice versa.

In some embodiments, the radio station manager 12 may incorporate feedback from an administrator and/or users into the formation of the radio station directory 26. For example, feedback from a user or administrator may identify duplicate stations that were not previously identified. In some embodiments, the radio station manager 12 may identify a whether the confidence score passes an investigation threshold to flag an entry for further investigation. For example, an entry may have a confidence score that passes the investigation threshold, but does not reach the duplicate threshold, and, as such, the entry may be flagged for investigation. Furthermore, in some embodiments, feedback may be received (e.g., via a user input to a client device 16) indicative of provider 14 performance (e.g., quality of feed), accuracy of station identification in response to the user's requested station, and/or identification of related stations and/or aliases, including national brands as discussed further below. Moreover, in some embodiments, the feedback may be user instigated or be prompted, for example, on the client device 16 via a platform 18. Additionally or alternatively, an administrator may change the priority status of the providers 14 and/or change the availability status of radio stations from certain providers 14 based on preferences, playback rights, user feedback, and/or regulations.

Furthermore, in some scenarios, it may be desirable to prioritize some providers 14 over others. For example, it may be desirable to prioritize feeds from first party providers over second party providers and third party providers and, further, to prioritize feeds from second party providers over third party providers. Additionally, some providers 14 may provide higher quality audio and/or provide additional information to the client device 16 such a description of the current audio feed (e.g., song title, artist name, topic of conversation, talk show name, etc.). As such, a radio station from a prioritized provider 14 may be shown via the radio station directory 26, while duplicate entries (e.g., of the same provider 14 or of a provider 14 of lower priority) are hidden.

Additionally, as discussed in more detail below, depending on the availability 64 of the prioritized provider 14 the hidden entries (e.g., from providers 14 of lower priority) may be enabled as backups to the prioritized provider or enabled in locations where the prioritized provider is not available. For example, if a first provider is prioritized in a first geographical region, but unavailable in a second geographical region, a second provider may be disabled in the first geographical region, but enabled in the second geographical region.

Figure 9:
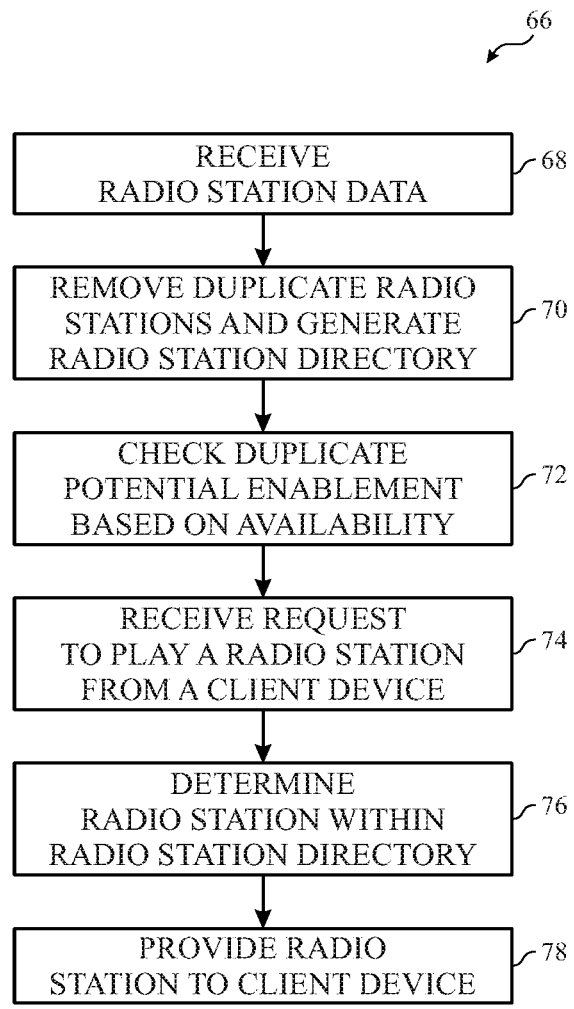
FIG. 9 is a flow chart of an example process for supplying a requested radio station, in accordance with an embodiment.

FIG. 9 is a flowchart of an example process 66 for generating and utilizing a searchable radio station directory 26 for accurate and efficient distribution of a requested radio station to a client device 16. The radio station manager 12 may receive radio station data 54 from one or more providers 14 (process block 68). The radio station manager 12 may then remove duplicate radio stations (e.g., from the conglomerated listing 52) and generate the radio station directory 26 (process block 70). Duplicate radio stations may be checked for potential enablement based on availability 64 (process block 72). A request from a client device 16 may be received (e.g., by the radio station manager 12 and/or the platform 18) to play a radio station (process block 74), and the platform 18 and/or the radio station manager 12 may determine the requested radio station from the radio station directory 26 (process block 76). The requested radio station may then be provided to the client device 16 according to the radio station directory 26 (process block 78).

As outlined above, the availability 64 of a particular radio station may vary based on the provider. For example, returning to FIG. 8, Index 1 and Index 5 may be identified as the same radio station provided by "Provider 1" and "Provider 2," respectively. However, the availability 64 of Index 1 is the U.S.A. and the availability 64 of Index 5 is the U.S.A. and Mexico. As such, even if "Provider 1" had a higher priority, and would be utilized for a client device 16 in the U.S.A., the radio station manager 12 may enable "Provider 2" for a radio station directory 26 for a client device 16 in Mexico. To help illustrate, FIG. 10 is an example U.S.A. radio station directory 80 and FIG. 11 is an example Mexico radio station directory 82, based on the conglomerated listing of FIG. 8, with a higher priority given to "Provider 1."

As discussed above, the availability 64 of a radio station from a particular provider 14 may vary based on the location of the client device 16. As such, the radio station directory 26 may be filtered and/or a particular radio station directory 26 may be used (e.g., the U.S.A. radio station directory 80), based on the location of the client device 16. Moreover, based on the priority of the providers 14, a radio station directory 26 may have hidden providers 84. If the higher priority provider losses availability 64, for example due to playback rights and/or a service interruption, the hidden provider 84 may be enabled and provide the feed of the radio station to the client device 16. As such, the radio station manager 12 and/or platform 18 may provide a radio station directory 26 of radio stations available to a client device 16 in a particular geographical region (e.g., country, state, etc.), sans duplicates, while supplying the feed of the highest priority provider 14 available in the particular geographical region. In other words, radio stations and/or providers 14 may be prioritized, enabled, and/or disabled based on location data of the client device 16 and/or availability 64 (e.g., playback rights). As such, the number of radio stations available in a particular region may be maximized by enabling lower priority providers 14 when no higher priority provider 14 is present, and duplicates may be reduced by disabling or hiding identified duplicate stations from lower priority providers 14, when a higher priority provider 14 is available.

Figure 12:
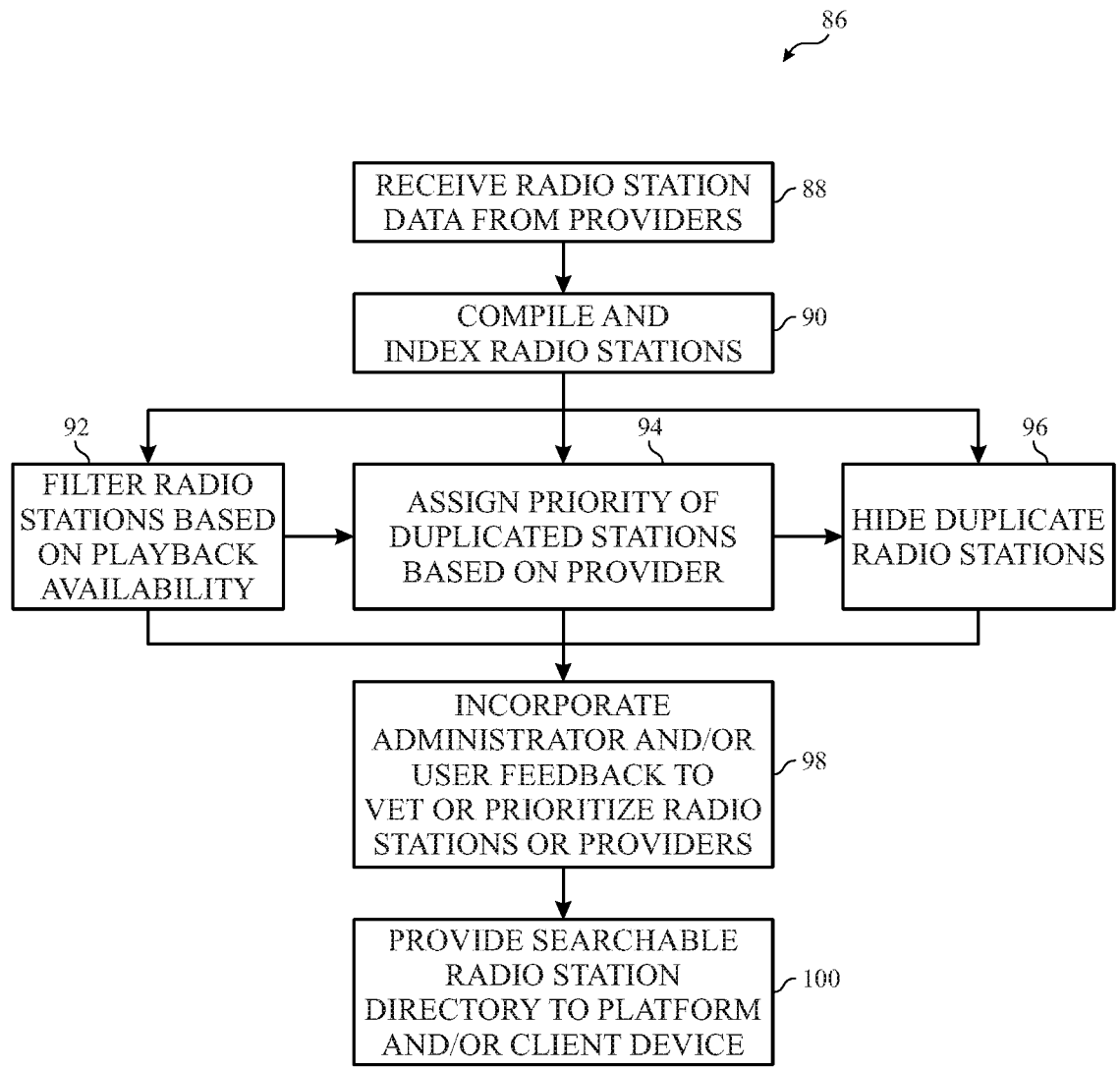
FIG. 12 is a flow chart of an example process for generating a radio station directory, in accordance with an embodiment.

FIG. 12 is a flowchart of an example process 86 of generating a radio station directory 26. The radio station manager 12 may receive radio station data 54 from one or more providers 14 (process block 88). Additionally, the radio station manager 12 may compile and index the received radio stations (process block 90). The radio stations may be filtered based on playback availability 64 (process block 92), and priority may be assigned to duplicate stations based on provider 14 (process block 94). Duplicate radio stations (e.g., of a lesser priority provider 14 or from the same provider 14) may be hidden (process block 96), for example, to reduce the size of radio station directory 26 and/or increase search efficiency. Administrator and/or user feedback may be incorporated into the radio station directory 26, for example, to vet or prioritize radio stations or providers 14 (process block 98). The radio station manager 12 may then provide a searchable radio station directory 26 to one or more platforms 18 and/or client devices 16 (process block 100).

To ascertain the radio station directory 26 available to a particular client device 16, in some embodiments, the radio station manager 12 and/or the platform 18 may obtain location data of the client device 16. The location data may include a physical location of the client device 16 (e.g., based on a GPS signal, cellular tower proximity, etc.) or other geological data associated with the client device 16 (e.g., a billing address for a user account, an Internet Protocol (IP) address of the client device 16, etc.). In some embodiments, the platform 18 may associate the client device 16 with a location based on a user setting. Additionally or alternatively, the current location of the client device 16 may be sent to the platform 18 and/or the radio station manager 12 with the request to access a radio station.

The location data of the client device 16 may affect the radio station directory 26, for example by region (e.g., state, country, county, etc.) as discussed above. Additionally, radio stations of the radio station directory 26 may be limited by playback rights of the providers 14 or compliance with local regulations. As such, in some embodiments, the location data of the client device 16 may be used by the radio station manager 12 and/or the platform 18 utilized by the client device 16 to enable/disable certain radio stations, enable/disable certain providers 14, and/or enable/disable specific radio stations from a specific provider 14.

Figure 13:
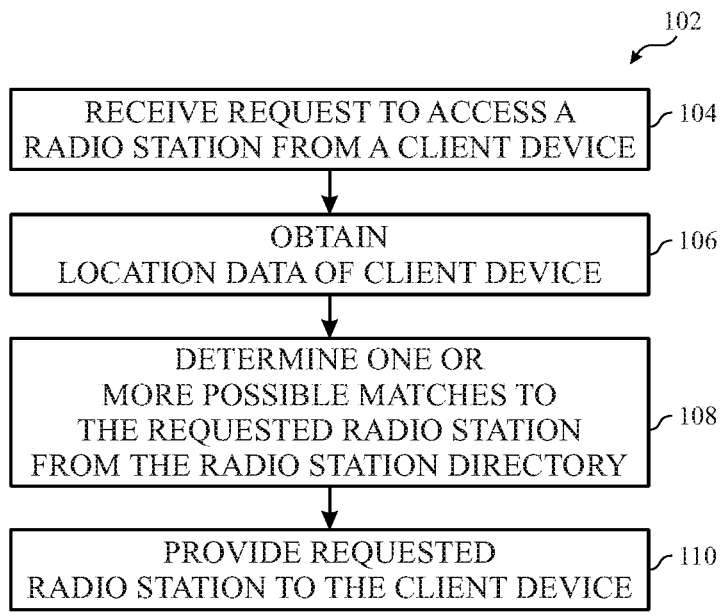
FIG. 13 is a flow chart of an example process for fulfilling a request to access a radio station, in accordance with an embodiment.

FIG. 13 is a flowchart of an example process 102 for fulfilling a request to access a radio station. A request to access a radio station from the client device 16 may be received (process block 104), for example, via the platform 18. Additionally, the platform 18 and/or radio station manager 12 may obtain location data of the client device 16 (process block 106). One or more possible matches to the requested radio station may be obtained from the radio station directory 26 (process block 108). For example, matches may be determined based on the availability 64 (e.g., based on the location data) and/or additional information such as the location data, user preferences, usage history, or a combination thereof. Furthermore, in some embodiments, the matches may be determined based on a scoring (e.g., confidence score) by the utilized platform 18. For example, the platform 18 may generate a confidence score for multiple radio stations to determine which most closely relates/matches the requested radio station. Subsequently, the requested radio station may be provided to the client device 16 (process block 110). As should be appreciated, the user search may be general enough to result in multiple potential matches to the request. As such, in some embodiments, a user selection may identify the requested radio station from a list of matches or potential matches. Additionally, or alternatively, a radio station may be automatically started based on the confidence score of the match.

Furthermore, although duplicate radio stations with similar audio feeds may be reduced or eliminated from the radio station directory 26, in some scenarios, a nationally branded radio station may have multiple similarly named radio stations with different audio feeds. As used herein a "national brand" may be a group of affiliated radio stations that are separate (e.g., may have different audio feeds at a given moment in time), but may be identified together. For example, National Public Radio (NPR) may be considered a radio station, but may also be recognized as a national brand for having multiple local affiliate radio stations (e.g., separated by geographic region). As such the radio station manager 12 may maintain each affiliate radio station as a separate entry for the radio station directory 26, but may also tag relationships such as a national brand. In the example of FIGS. 8 and 10, Index 7, Index 8, and Index 11 may be identified as affiliated with the national brand of NPR, and therefore may be "tagged." For example, the radio station manager 12 may maintain relationship tags 85 such that when a national brand is requested, the related radio stations are considered as potential matches. Although a radio station may include one or more relationship tags 85, the radio station may still maintain its own identity. For example, Index 7 may also be accessed by requesting "Houston Public Media" in addition to NPR.

Additionally, although the location data of the client device 16 may be used to determine radio station availability 64, the location data may also be used to determine which of the potential matches to the requested radio station. For example, referring again to FIG. 10, if a request from the client device 16 included a request for "NPR," both "Houston Public Media" in Hou, Tex. and "NPR" in S.J., Calif. may be identified, at least in part by the relationship tag 85, as fitting the requested description. However, if the client device 16 is currently located in Hou, Tex., then the Hou, Tex. affiliate of NPR may be prioritized in the potential matches. As such, the local affiliate (e.g., closest affiliate within a range) may be auto-played or placed toward the top of a listing of results on the client device 16 in response to a request for a national brand.

Additionally or alternatively, the client device 16 and/or platform 18 may utilize the context of the radio station request in conjunction with or separately from the location data of the client device 16. For example, a request for "94.5 San Jose" may yield "The Bay" as a potential match, even if the client device is located in Houston. As such, contextual information provided by the user may also be utilized (e.g., as part of the scoring) to determine potential matches for the request.

Additionally, in some embodiments, radio stations with a broadcast location 62 within a distance (e.g., 50 miles, 100 miles, 250 miles, etc.) of the client device 16 and/or affiliated with radio stations with a broadcast location 62 within a distance of the client device 16 may be prioritized in the potential matches. For example, if the client device 16 is within a distance from a local affiliate station (e.g., "NPR" in S.J., Calif.), the request of the client device 16 may be satisfied by returning the local affiliate station instead of and/or without an option for the other affiliates or radio stations outside the range. Furthermore, genericized requests, such as requests for a genre of music, may also be filtered based on the location data of the client device. Moreover, in some embodiments, the range may be set by a user setting of the client device 16. Additionally or alternatively, in some embodiments, potential matches to the requested station may be identified based on user preferences set via the client device 16 and/or past searches.

Additionally, relationship tags 85 and/or different metadata identifiers may be used to account for aliases of radio stations, which may include alternative branding such as local jargon, slogans, and/or phonetic pronunciation of a radio station identifier 58 one or more words instead of by sounding out the letters. In other words, radio stations may be identified by names other than their station name 56 or frequency 60. In some embodiments, such aliases may be received by the radio station manager 12 from the providers 14, manually input (e.g., via users and/or an administrator), recognized using phonetic variances of the radio station identifier 58, and/or taught (e.g., using machine learning) over time by usage and feedback by a client device 16. A database of aliases and alternative brandings may be maintained by the provider 14 and/or the radio station manager 12, for example, as part of the radio station directory 26. As discussed above, feedback may be used to enhance future identification of radio station requests. Additionally or alternatively, the requests themselves may be analyzed (e.g., via speech to text analysis and/or text string identification) to assist in present and future request identification of radio station aliases.

Figure 14:
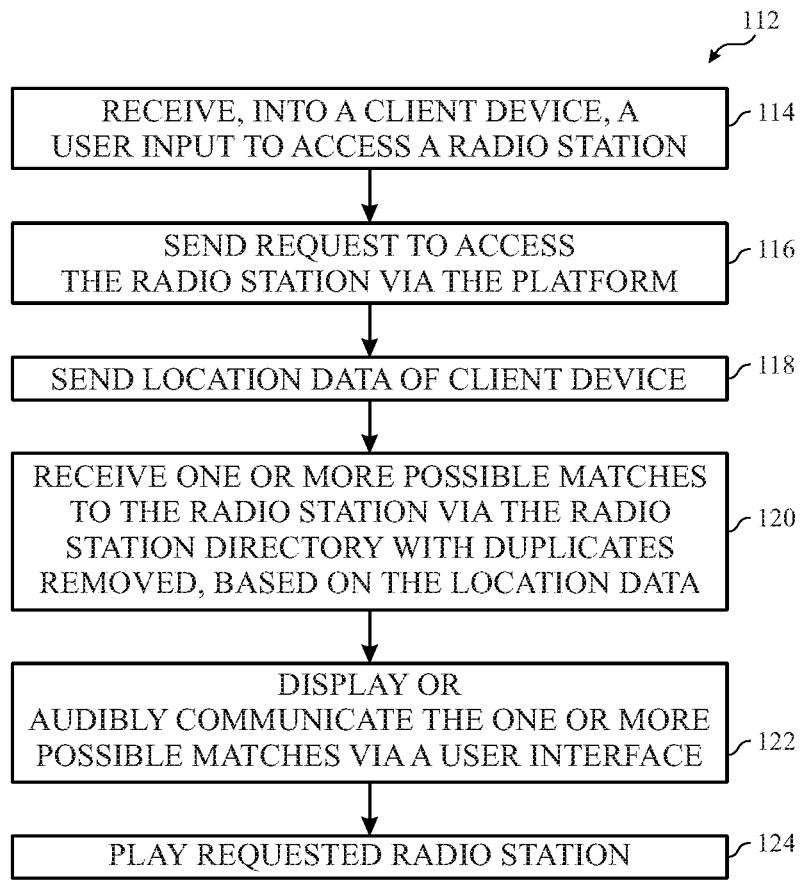
FIG. 14 is a flow chart of an example process for requesting access to a radio station, in accordance with an embodiment.

FIG. 14 is a flowchart of an example process 112 for requesting access to a radio station from a client device 16 via the radio station directory 26. The client device 16 may receive a user input to access a radio station (process block 114). The client device 16 may then send a request to access the radio station via the platform 18 (process block 116). In some embodiments, the client device 16 may send location data associated with the user and/or client device 16 via the platform 18 (process block 118). The client device 16 may also receive one or more possible matches to the requested radio station via the radio station directory 26. The possible matches may have duplicate radio stations removed and be based on the location data of the client device 16 (process block 120). Additionally, the client device 16 may display or audibly communicate the one or more possible matches via a user interface (e.g., the electronic display 28 and/or the audio interface 44) (process block 122). The client device 16 may also then play the requested radio station (process block 124). In some embodiments, the client device 16 may receive a user input to select a radio station from the possible matches. Additionally or alternatively, the client device 16 may automatically play the requested radio station, as best interpreted, from the radio station directory 26.

As discussed herein, the radio station manager 12 may provide a radio station directory 26 to facilitate more accurate and efficient access of available radio stations to a client device 16 based on location data of the client device 16, playback rights, and priority of providers 14. Moreover, the reduction of duplicate radio stations, prioritization of providers 14, and recognition of national brands and/or aliases may increase the efficiency of platforms 18 and client devices 16 by reducing the amount of parsing and increasing the accuracy of identifying the desired radio station for a given request. Furthermore, although the above referenced flowcharts of the processes 66, 86, 102, 112 are shown in a given order, in certain embodiments, the depicted steps may be reordered, altered, deleted, and/or occur simultaneously. Additionally, the referenced flowcharts of the processes 66, 86, 102, 112 are given as illustrative tools, and further decision and/or process blocks may be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system comprising:
 a radio station manager comprising one or more processors and configured to:
  receive, via the one or more processors, radio station data associated with a plurality of radio stations from one or more providers; and
  generate, via the one or more processors, a radio station directory based at least in part on the radio station data, wherein generating the radio station directory comprises:
   determining a playback availability of each radio station of the plurality of radio stations for the one or more providers, wherein the playback availability is determined based on a listening location;
   determining duplicate radio stations among the plurality of radio stations based at least in part on metadata associated with each radio station of the plurality of radio stations; and
   removing the duplicate radio stations from the plurality of radio stations; and
 a platform configured to:
  associate radio station aliases to at least a portion of the plurality of radio stations, wherein the radio station aliases comprise alternate names corresponding to the portion of the plurality of radio stations;

receive, from a client device of the platform, a request for a radio station of the plurality of radio stations, wherein the request comprises a radio station alias of the radio station aliases;

identify a matched radio station from the radio station directory corresponding to the radio station; and provide an audio feed of the matched radio station corresponding to the radio station alias to the client device.

2. The system of claim 1, wherein the radio station manager is configured to determine the duplicate radio stations among the plurality of radio stations based at least in part on a metadata group, wherein the metadata group comprises a frequency band, a radio frequency, and at least one other metadata component.

3. The system of claim 2, wherein the at least one other metadata component comprises a broadcast location.

4. The system of claim 1, wherein the radio station manager is configured to assign relationship tags to at least a second portion of the plurality of radio stations of the radio station directory, wherein the relationship tags identify affiliated radio stations, and wherein in response to the request corresponding to the affiliated radio stations, the platform is configured to select and provide the audio feed of one of the affiliated radio stations based on the listening location of the client device.

5. The system of claim 1, wherein the request is a voice request, and wherein the radio station alias comprises a phonetic pronunciation of a broadband identifier of the radio station.

6. A method comprising:
receiving, via one or more processors, radio station data associated with a plurality of radio stations from one or more providers;

generating, via the one or more processors, a radio station directory based at least in part on the radio station data, wherein generating the radio station directory comprises:
determining a playback availability of each radio station of the plurality of radio stations for the one or more providers, wherein the playback availability comprises a broadcast right in a geographic region associated with the one or more providers and is determined based on a listening location relative to the geographic region independent of a radio frequency (RF) reception, of the listening location, associated with RF broadcasts of the plurality of radio stations;

determining duplicate radio stations among the plurality of radio stations based at least in part on metadata associated with each radio station of the plurality of radio stations; and removing the duplicate radio stations from the plurality of radio stations; and supplying, via the one or more processors, the radio station directory to a platform servicing a client device.

7. The method of claim 6, comprising assigning a priority to the one or more providers, wherein, in response to a first provider of the one or more providers of a first radio station having a higher priority than a second provider of the one or more providers, the second provider is disabled in the radio station directory.

8. The method of claim 7, wherein removing the duplicate radio stations from the plurality of radio stations comprises hiding a radio station of the plurality of radio stations provided by a lower priority provider in response to identifying that a higher priority provider also provides the radio station.

9. The method of claim 6, wherein the metadata comprises a radio station name, a radio station identifier, a frequency band, a radio frequency, a location, or a combination thereof.

10. The method of claim 9, wherein determining the duplicate radio stations from the plurality of radio stations comprises comparing a first grouping of metadata comprising the frequency band, the radio frequency, and the location of two or more radio stations of the plurality of radio stations.

11. The method of claim 10, wherein determining the duplicate radio stations from the plurality of radio stations comprises comparing a second grouping of metadata comprising the frequency band, the radio frequency, and the radio station name of the two or more radio stations of the plurality of radio stations, wherein the first grouping of metadata comprises a higher priority than the second grouping of metadata.

12. The method of claim 6, comprising:
receiving, via the one or more processors, a request from the client device to access a radio station;

receiving, via the one or more processors, the listening location of the client device; and supplying the radio station to the client device via a provider of the one or more providers with a highest priority associated with the radio station.

13. The method of claim 6, wherein the playback availability is based on the listening location of the client device.

14. The method of claim 13, wherein the listening location comprises a physical location of the client device.

15. The method of claim 6, comprising assigning, via the one or more processors, a relationship tag to each of two or more related radio stations of the plurality of radio stations within the radio station directory, wherein a request, by the client device, for a national brand corresponding to the relationship tag returns a closest related radio station of the two or more related radio stations based at least on the listening location of the client device.

16. A method comprising:
requesting, via a client device, access to a feed of a radio station, wherein the request is configured to instruct a platform servicing the client device to search a radio station directory for the radio station, wherein the radio station directory is generated by:
receiving, via one or more processors, radio station data associated with a plurality of radio stations from one or more providers; and generating, via the one or more processors, the radio station directory based at least in part on the radio station data, wherein generating the radio station directory comprises:
determining a playback availability of each radio station of the plurality of radio stations for the one or more providers, wherein the playback availability of each radio station of the plurality of radio stations is determined based on a listening location of the client device independent of a radio frequency (RF) reception, of the client device, associated with RF broadcasts of the plurality of radio stations;

determining duplicate radio stations among the plurality of radio stations based at least in part on metadata associated with each radio station of the plurality of radio stations; and removing the duplicate radio stations from the plurality of radio stations.

17. The method of claim 16, comprising:
receiving, via the client device, one or more radio station candidates identified by the platform as corresponding to the request; and
playback, via the client device, of a selected radio station of the one or more radio station candidates, wherein the selected radio station is selected based at least in part on a user input or scoring of the one or more radio station candidates by the platform.

18. The method of claim 16, comprising sending feedback, via the client device, corresponding to matching of the radio station to one of the plurality of radio stations or identifying a related radio station as part of a national brand, wherein an update of the radio station directory is based at least in part on the feedback.

19. The system of claim 1, wherein the playback availability of each radio station of the plurality of radio stations is determined based on the listening location independent of a radio frequency (RF) reception, at the listening location, associated with RF broadcasts of the plurality of radio stations.

\* \* \* \* \*